(12) United States Patent
Carroll, III et al.

(10) Patent No.: US 6,682,128 B2
(45) Date of Patent: Jan. 27, 2004

(54) COMPOSITE ENERGY ABSORBER

(75) Inventors: Phillip Patrick Carroll, III, Bloomfield Hills, MI (US); Joel Matthew Cormier, Ferndale, MI (US); Donald Scott Smith, Commerce Township, MI (US); Richard Francois Audi, Dearborn, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 4 days.

(21) Appl. No.: 09/884,813

(22) Filed: Jun. 19, 2001

(65) Prior Publication Data

US 2002/0017805 A1 Feb. 14, 2002

Related U.S. Application Data

(63) Continuation-in-part of application No. 09/499,205, filed on Feb. 7, 2000, now Pat. No. 6,247,745, which is a continuation-in-part of application No. 09/328,196, filed on Jun. 8, 1999, now Pat. No. 6,199,942, which is a continuation-in-part of application No. 09/018,666, filed on Feb. 4, 1998, now Pat. No. 6,017,084.

(51) Int. Cl.[7] .............................................. B60R 21/04
(52) U.S. Cl. .................. 296/187.03; 293/133; 280/751; 188/371
(58) Field of Search ................................ 296/189, 39.1, 296/188; 293/102, 132, 133, 109, 110; 280/781, 748; 206/521.4, 521.9, 521.8; 180/377, 371; 428/371, 178, 166

(56) References Cited

U.S. PATENT DOCUMENTS

| | | |
|---|---|---|
| 2,346,161 A | 4/1944 | Grant |
| 2,349,907 A | 5/1944 | Kos et al. |
| 3,088,539 A | 5/1963 | Mathues et al. |
| 3,231,454 A | 1/1966 | Williams |

(List continued on next page.)

FOREIGN PATENT DOCUMENTS

| | | |
|---|---|---|
| DE | 199 47 245 A1 | 4/2000 |
| EP | 56131849 | 10/1981 |
| EP | 0 863 056 A1 | 9/1998 |
| WO | WO 00/01525 | 1/2000 |
| WO | WO 00/31434 | 6/2000 |

OTHER PUBLICATIONS

Supplementary European Search Report, Application No. EP 00 94 1232, Mar. 17, 2003.
International Search Report, Application No. PCT/US 02/37005, Mar. 31, 2003.
PCT International Search Report for PCT/US02/19527, filed Jun. 19, 2002, mailed Mar. 3, 2003.

*Primary Examiner*—Joseph D. Pape
(74) *Attorney, Agent, or Firm*—Brooks Kushman P.C.

(57) ABSTRACT

A composite modular energy absorbing assembly with one or more gamma structures 100 that are interposed with one or more delta structures 200. The gamma structures have a base 12' and a plurality of recesses 16' defined therewithin. The recesses 16' have at least one wall 20' extending from the associated base 12'. At least some of the recesses 16' are oriented such that their walls are substantially parallel to a major incident component of an impacting force. The walls 20' collapse. The delta structures 200 have a lattice 210 of interconnected strands which intersect to define a plurality of cells 220. The plane of at least some of these cells are substantially parallel to the impacting force. The lattice collapses during energy absorption. The composite assembly serves to decelerate an object that impacts thereupon in order to maximize energy absorption over a given distance. In alternate embodiments, stacking arrangements include: gamma structures alone; or delta structures alone.

11 Claims, 7 Drawing Sheets

U.S. PATENT DOCUMENTS

| | | |
|---|---|---|
| 3,684,235 A | 8/1972 | Schupbach |
| 3,782,767 A | 1/1974 | Moore |
| 3,871,636 A | 3/1975 | Boyle |
| 3,926,463 A | 12/1975 | Landwehr et al. |
| 3,933,387 A | 1/1976 | Salloum et al. |
| 3,997,207 A | 12/1976 | Norlin |
| 4,022,505 A | 5/1977 | Saczawa, Jr. |
| 4,029,350 A | 6/1977 | Goupy et al. |
| 4,190,276 A | 2/1980 | Hirano et al. |
| 4,321,989 A | 3/1982 | Meinzer |
| 4,352,484 A | 10/1982 | Gertz et al. |
| 4,413,856 A | 11/1983 | McMahan et al. |
| 4,631,221 A | 12/1986 | Disselbeck et al. |
| 4,635,981 A | 1/1987 | Friton |
| 4,666,130 A | 5/1987 | Denman et al. |
| 4,720,261 A | 1/1988 | Fishwick et al. |
| 4,844,213 A | 7/1989 | Travis |
| 4,909,661 A | 3/1990 | Ivey |
| 5,030,501 A | 7/1991 | Colvin et al. |
| 5,033,593 A | 7/1991 | Kazuhito |
| 5,141,279 A | 8/1992 | Weller |
| 5,165,990 A | 11/1992 | Nakano |
| 5,192,157 A | 3/1993 | Laturner |
| 5,306,066 A | 4/1994 | Saathoff |
| 5,364,682 A | 11/1994 | Tanaka et al. |
| 5,382,051 A | 1/1995 | Glance |
| 5,399,406 A | 3/1995 | Matsuo et al. |
| 5,435,619 A | 7/1995 | Nakae et al. |
| 5,500,037 A | 3/1996 | Alhamad |
| 5,518,802 A | 5/1996 | Colvin et al. |
| 5,573,272 A | 11/1996 | Teshima |
| 5,636,866 A | 6/1997 | Suzuki et al. |
| 5,660,426 A | 8/1997 | Sugimori et al. |
| 5,700,545 A | 12/1997 | Audi et al. |
| 5,727,826 A | 3/1998 | Frank et al. |
| 5,731,062 A | 3/1998 | Kim et al. |
| 5,762,392 A | 6/1998 | Suga |
| 5,972,477 A | 10/1999 | Kim et al. |
| 6,017,084 A | 1/2000 | Carroll, III et al. |
| 6,199,942 B1 | 3/2001 | Carroll, III et al. |
| 6,247,745 B1 | 6/2001 | Carroll, III et al. |

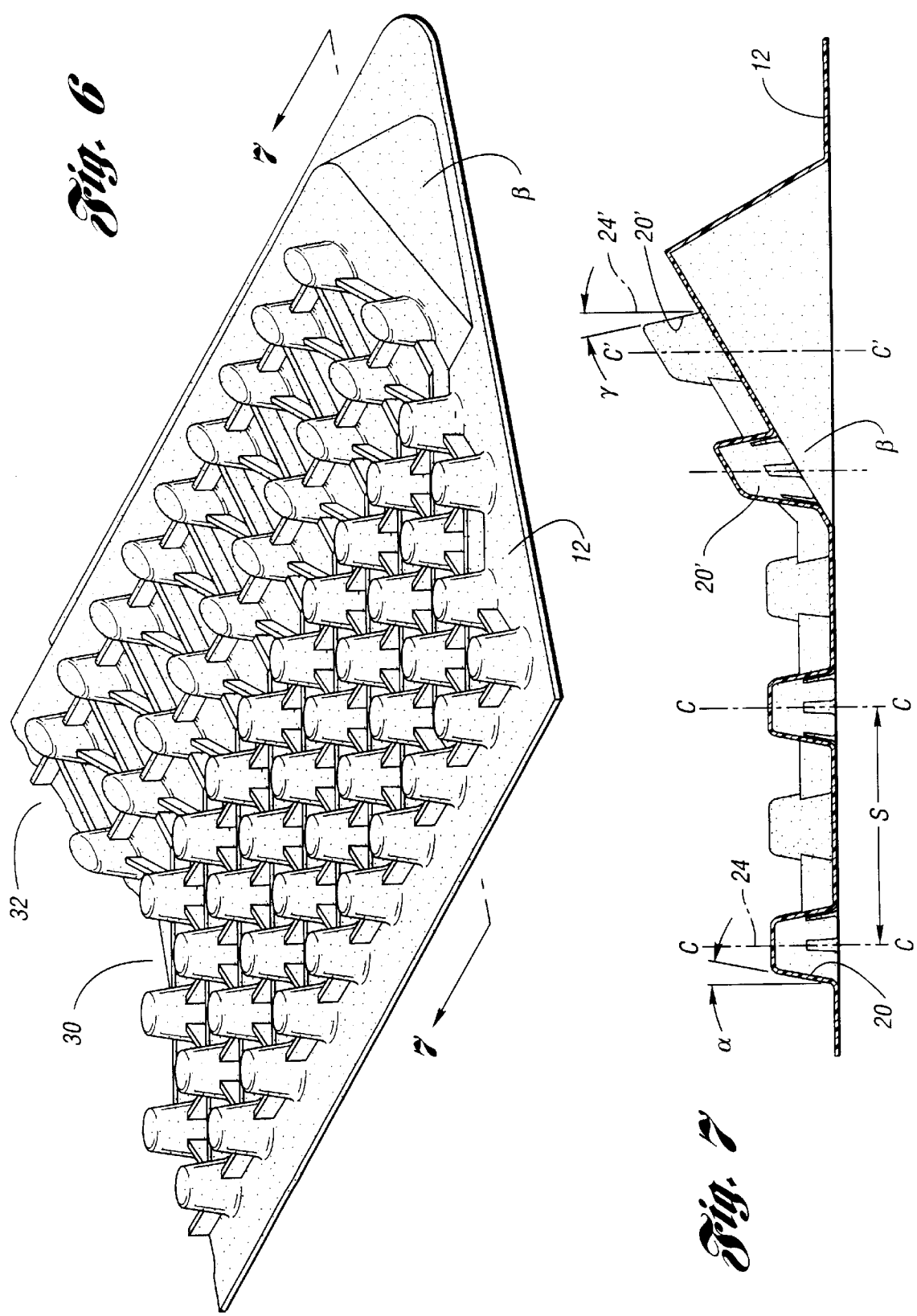

COMPOSITE ENERGY ABSORBER

CROSS-REFERENCE TO RELATED APPLICATIONS

This application is a continuation-in-part of U.S. application Ser. No. 09/499,205 filed Feb. 7, 2000 (to be issued as U.S. Pat. No. 6,247,745), which is a continuation-in-part of of U.S. application Ser. No. 09/328,196) (now U.S. Pat. No. 6,199,942) filed Jun. 8, 1999, which is a continuation-in-part of of U.S. application Ser. No. 09/018,666 filed Feb. 4, 1998 (now U.S. Pat. No. 6,017,084), the disclosures of which applications being incorporated by reference herein.

BACKGROUND OF THE INVENTION

1. Field of the Invention

This invention relates to a composite energy absorber for decelerating an object that impacts the absorber.

2. Background Art

The prior art discloses numerous devices that absorb mechanical energy in various applications. Examples include protective packaging used in shipping containers, crash helmets, bumpers and vehicular interior components. Ideally, the most efficient energy absorber exerts a constant resistive force to decelerate an impacting object over the distance that the impacting object displaces the incident surface of the absorber. The most efficient curve would have a constant slope of zero. As an example, elastomeric solids many times act as springs where the force-deflection curve is essentially a straight line of a given slope. Many foam materials display a similar force-deflection curve, although the curves are usually of not of constant slope.

U.S. Pat. No. 3,933,387, entitled "Thermoformed Plastic Energy Absorber For Vehicles" concerns energy absorbing media that disclose identical truncated pyramids that extend from layered sheets of plastic stock which intermesh and mutually support each other. (Id., Col. 1, II. 7–9; Col. 3, II. 20–22.) The reference teaches that multiple sets of sheets may be stacked adjacent to each other in order to create an absorber within which the energy is absorbed. The pyramids of each sheet project onto the design quadrilateral of the opposing sheet and the edges of each pyramid contact the corresponding edges of the surrounding four pyramids. (Id., Col. 3, II. 32–36.).

Commonly owned U.S. Pat. No. 5,700,545, entitled Energy Absorbing Structure, discloses an energy absorbing device that offers a nearly constant resistance force over a deflection distance, which if exactly constant, would be theoretically most efficient in absorbing energy. The disclosure of this patent is incorporated herein by reference. Energy is absorbed by a lattice of interconnected strands of material with apertures between the strands, such that upon deformation the strands at least partially coalesce and the apertures at least partially close.

Commonly owned U.S. Pat. No. 6,017,084 discloses stranded structures that are oriented such that nearly all the metal structure is substantially in the crush plane. The strips of stranded metal are connected by the incident member. This reduces cost and weight of the assembly.

Commonly owned U.S. Pat. No. 6,199,942 describes a structure wherein the stranded metals are assembled into channels in a base and/or a structure of recesses formed in the base. Either or both structures may provide impact protection.

These and other energy absorbing members, in the automobile environment, are used to protect vehicle occupants and may be used in applications to meet the standard for head injury protection for automotive interiors (Federal Motor Vehicles Safety Standard 201) which is incorporated herein by reference. The standard requires that interior components must be tested using a 10 lbm headform impacting the surface at 15 mph. A measurement of HIC(d) (head injury criteria (dummy)) is determined according to a formula set forth in FMVSS 201. The value of HIC(d) should not exceed 1000.

The prior art leaves unsolved production problems that stem from relatively expensive and in some cases, less effectual approaches. Injection molding, reaction molding, extruding, blow molding, honeycomb formation, and stranded metal manufacture can be relatively costly. Additionally, it can be difficult to mold very thin wall thickness with some molding technologies.

In light of these and related approaches, there remains the desire to absorb as much impact energy in as little crush distance as possible, with as little weight that is necessary, yet be capable of being manufactured under favorable economic conditions.

SUMMARY OF THE INVENTION

It is an object of the present invention to provide a more cost effective, efficient energy absorber.

The invention includes a composite modular energy absorbing assembly comprising interposed structures, termed herein as "gamma" and "delta" structures. The gamma structures have a base and recesses defined within the base. The recesses include a wall extending from the base. In some cases, the wall collapses partially plastically and partially elastically in order to provide some spring-back following deformation. The gamma structure is similar to the second structure depicted in commonly owned U.S. Pat. No. 6,199,942.

The delta structures are positioned in operative engagement with the gamma structures. The delta structures have a lattice of interconnected strands which intersect to define cells. Some of the cells are oriented in a plane that is substantially parallel to the impacting force. Like the gamma structure, cells collapse partially plastically and partially elastically during energy absorption. Energy absorption by the delta structure is maximized over a given distance.

BRIEF DESCRIPTION OF THE DRAWINGS

FIG. 6 is a quartering perspective view of a second alternate embodiment of the disclosed invention;

FIG. 7 is a cross-sectional view taken along the line 7—7 of the embodiment of FIG. 6;

DETAILED DESCRIPTION OF THE PREFERRED EMBODIMENTS

Figure 1:
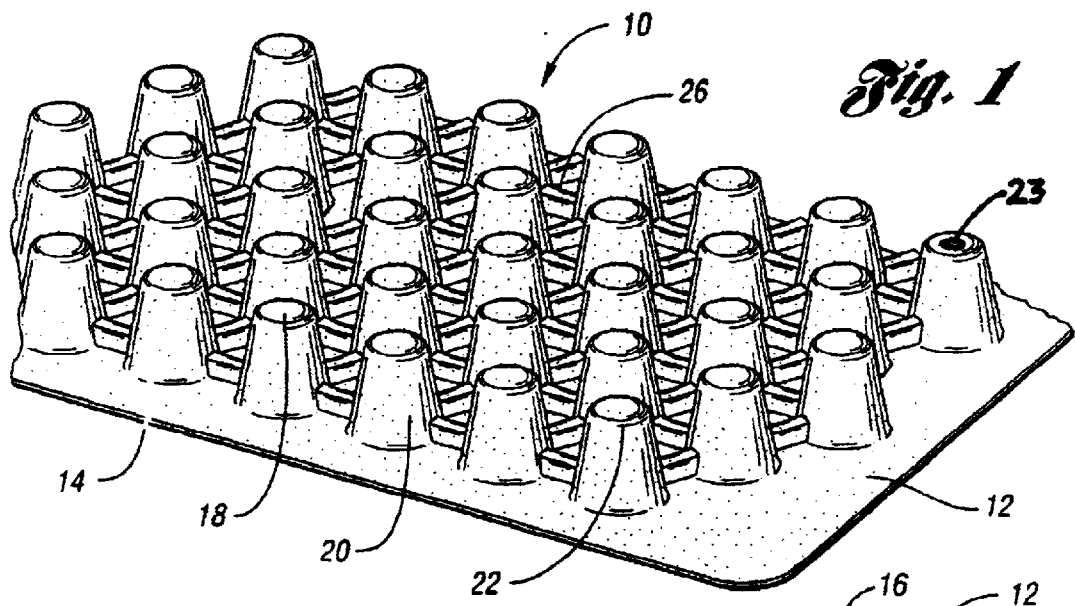
FIG. 1 is a quartering perspective view of a modular energy absorbing assembly manufactured in accordance with the present invention.
Figure 2:
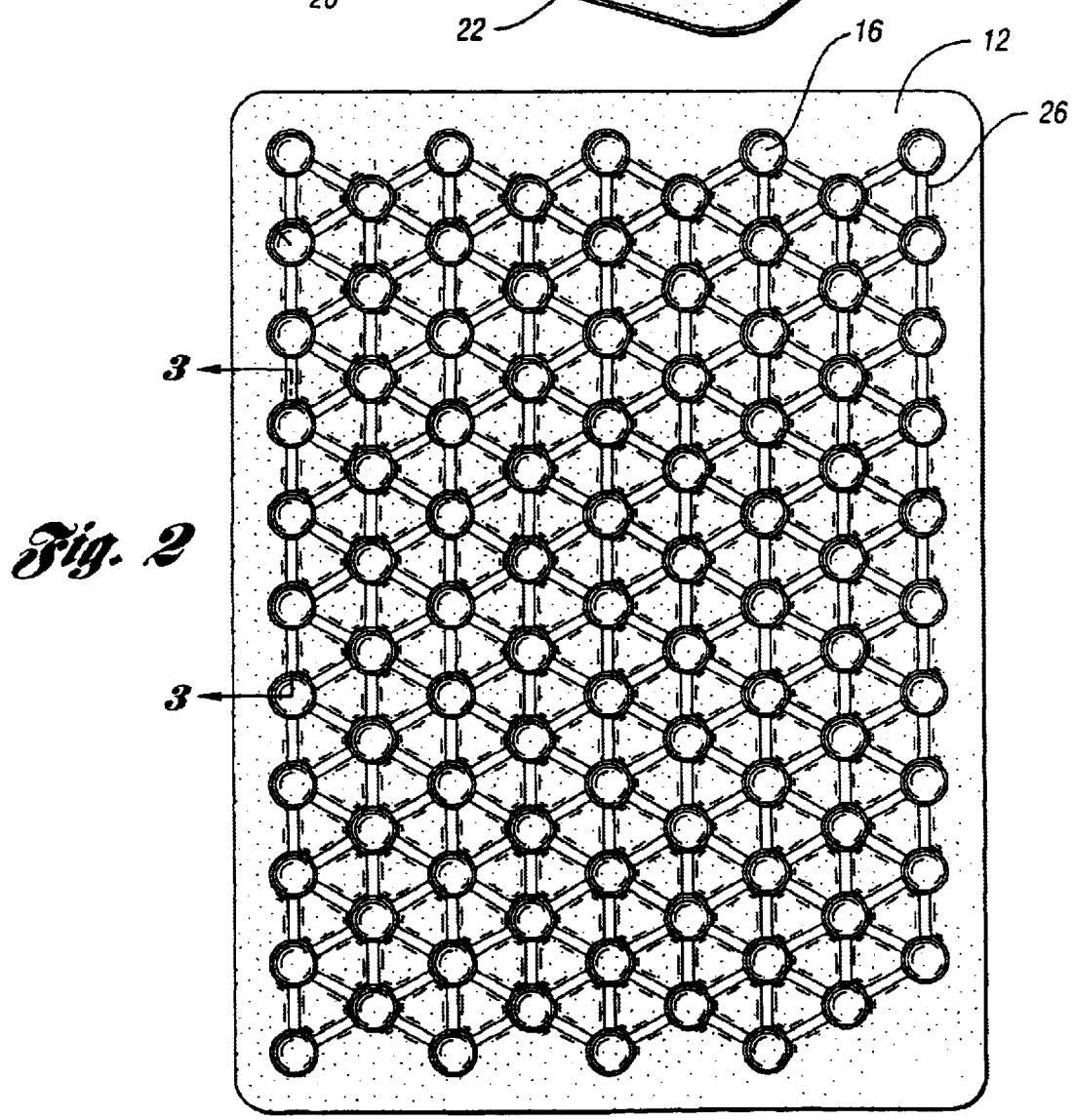
FIG. 2 is a bottom plan view thereof.
Figure 3:
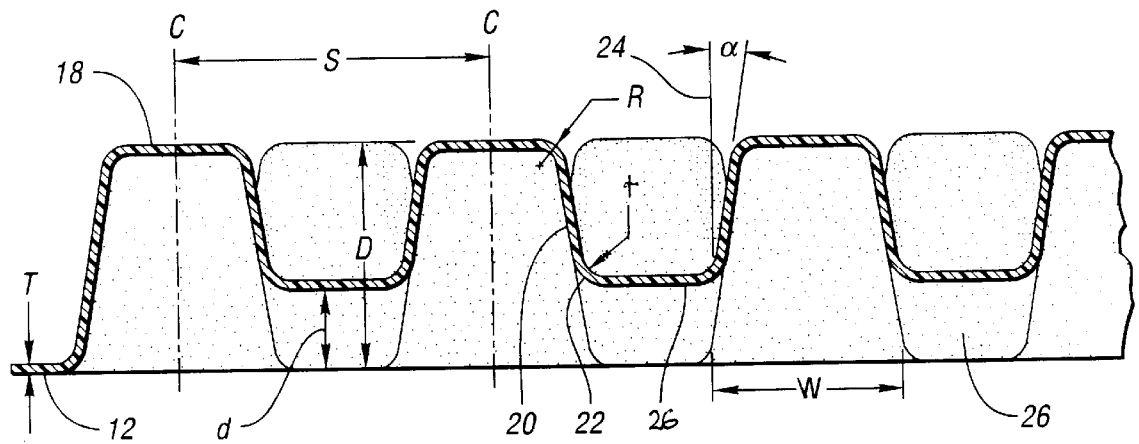
FIG. 3 is a cross-sectional view of the invention depicted in FIG. 2, taken along the 3—3 thereof.
Figure 11:
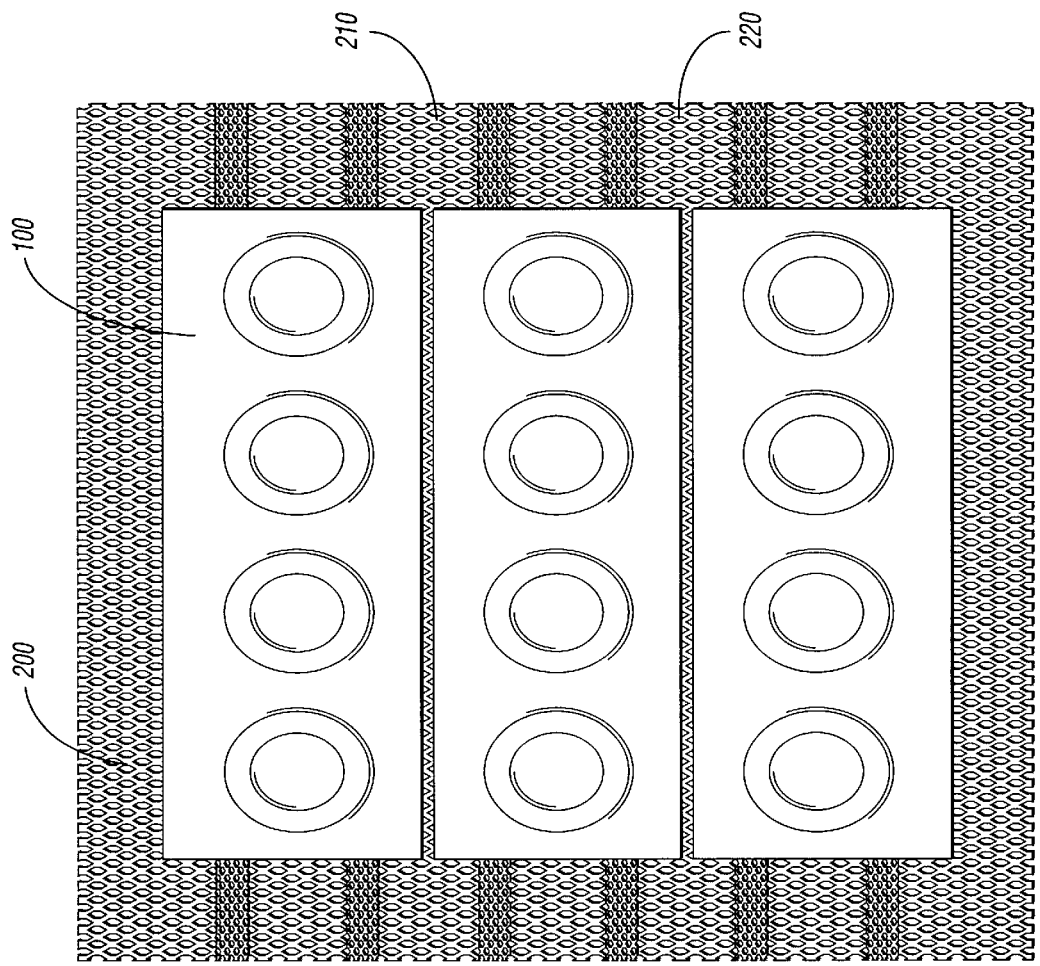
FIG. 11 is a top elevational view thereof.
Figure 10:
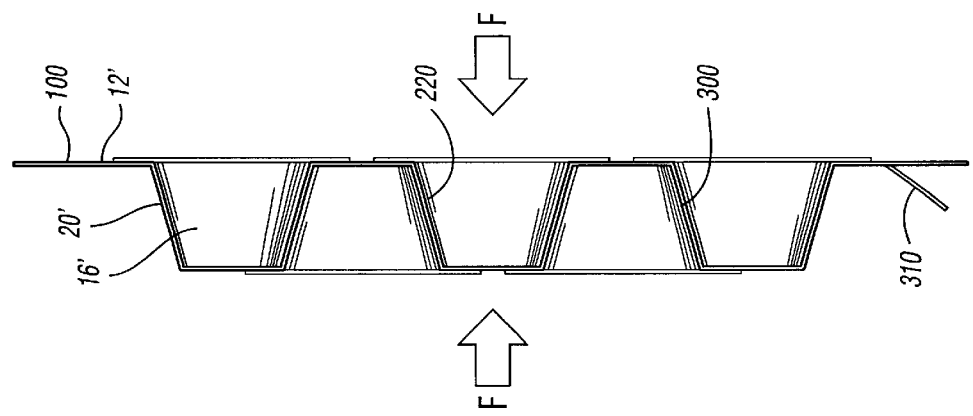
FIG. 10 is an end elevational view of a composite modular energy absorbing assembly which includes interposed gamma and delta structures.
Figure 12:
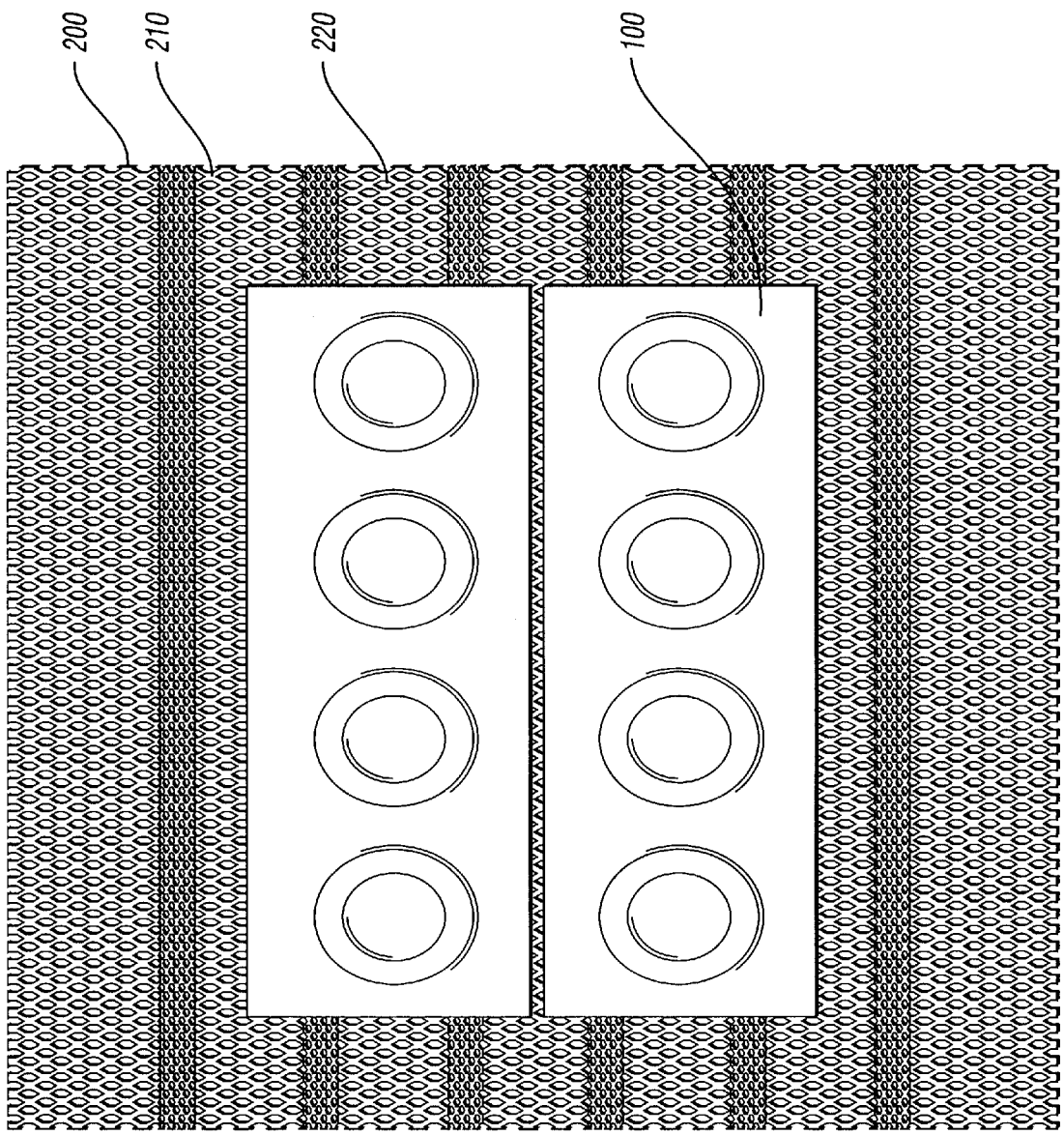
FIG. 12 is a bottom elevational view thereof.

Referring first to FIGS. 1–3 of the drawings, there is depicted a modular energy absorbing assembly 10 which has a base 12 and at least one energy absorbing module 14 associated with the base for accommodating deformation of the assembly. FIGS. 1–3 depict what is termed herein as a "gamma" structure (FIGS. 10–12). Each energy absorbing module 14 has a plurality of recesses 16 defined within and integral with the base. At least some of the recesses have a substantially flat, or domed floor 18, and at least one wall extending from the floor to the base. Interposed between the floor 18 and the at least one wall is an intermediate segment 22. The intermediate segment has an average radius (R), or may be non-circular (termed herein as "curvilinear"). It will be apparent that in many applications, the modular energy absorbing assembly/b may perform satisfactorily in an inverted position.

At least some of the recesses are oriented such that their floors are substantially orthogonal to a major incident component 24 (FIG. 3) of the impacting force. In a given recess, the wall is inclined at an angle (α) to the major incident component of the impacting force. The angle (α) is selected so that it lies between zero and 45 degrees in order to maximize energy absorption by the wall over a given distance. The wall at least partially collapses during energy absorption, and at least some of the recesses become at least partially compressed or shatter, in some cases. In a coordinated manner arising from mutual support afforded by adjacent recesses, the assembly serves to decelerate an object that impacts with an incident force thereupon. As the wall collapses, some of the deformation occurs elastically, thereby providing at least a partial "spring-back" following initial deformation.

Thus, the invention embraces a sheet of material with recesses tormeci in it. the sheet remains continuous after recesses are made, unless an aperture 23 is provided in a floor of a given recess (FIG. 1). Preferably, the recesses are integral with or are monolithic with the base and sheet from which they are formed. When thermoforming is the manufacturing method of choice, it will be appreciated that wall thickness may be smaller adjacent the base than adjacent the floor of a give recess.

Continuing with particular reference to FIG. 3, the recesses 18 of the gamma structure have imaginary central lines (C) which are spaced apart by a distance (S). The average depth of the recesses depicted in the embodiment of FIG. 3 is represented by the letter (D). The reference letter (d) represents the average depth of a channel 26 which communicates with adjacent recesses. The recesses are further characterized by the reference letter (W) which represents the diameter of the recess measured at the base, or basal plane 12. As illustrated, the base has a thickness represented by the reference letter (T). Another design variable is the radius (r) (FIG. 3) which characterizes the joinder of a wall 20 with a channel 26.

It will be noted from the views of FIGS. 1 and 3 that the walls 20 are connected by the floor 18 of a given recess, while walls of adjacent recess are connected by the base 12 or channel 26.

Continuing with reference to FIG. 3, the line 24 represents a major incident component of the impacting force, with respect to which the walls 20 are inclined at an angle (α) where (α) lies between 0 and 45°. In operation, the wall at least partially collapses (or loses structural integrity by shattering). Some or all of the recesses become compressed partially elastically during energy absorption while decelerating an object that impacts thereupon.

In the preferred embodiment, at least one wall is generally shaped as a frusto-conical surface and the intermediate segment has an average radius (R) of about 0.5 mm.

Impact tests have shown good results where the ratio of (D) to (W) is between about 0.5 and 0.3, while the ratio of (W) to (S) is between about 0.2 and 0.7. Good results have also been obtained when the recesses are further characterized by depth (D) to side thickness (T) ratio between about 4 and 20. Depending on the energy absorption requirements of the specific application, the depth of the channel (d) may be up to the depth (D) of the recess.

In various applications, experimentation has revealed that for a given geometry of recess, the inter-recess spacing (S) may affect the particular deformation characteristics. Preferably, the imaginary center (C) of at least some of the recesses is located at an apex of an equilateral triangle when viewed in the direction of the impacting object.

Figure 4:
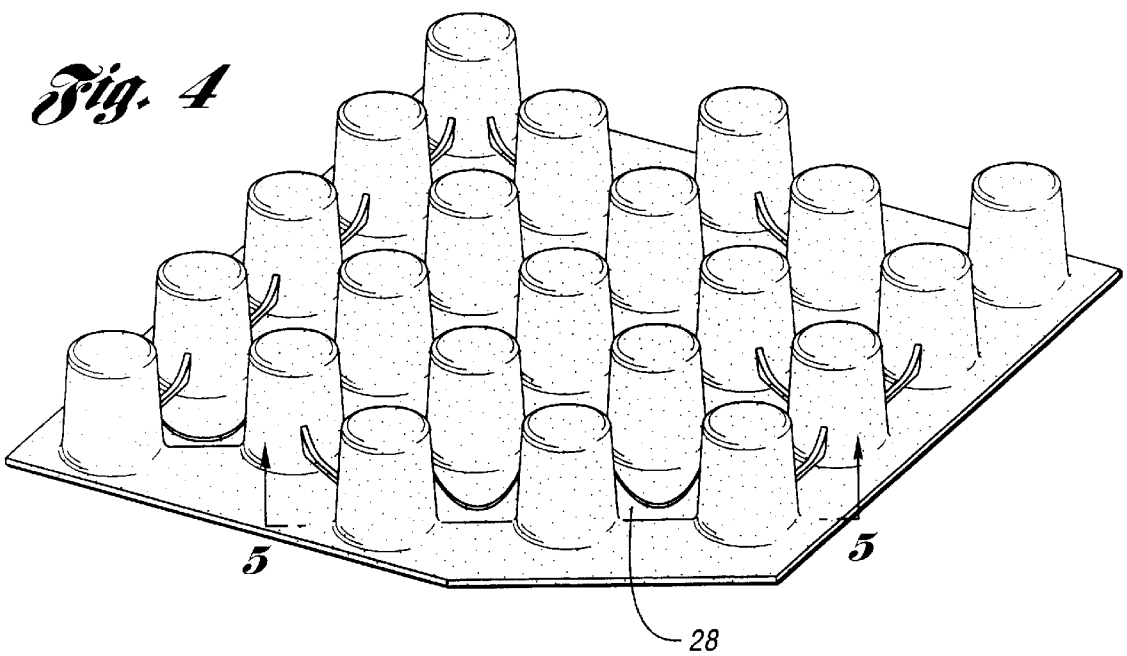
FIG. 4 is a quartering perspective view of an alternate embodiment of the disclosed invention.
Figure 5:
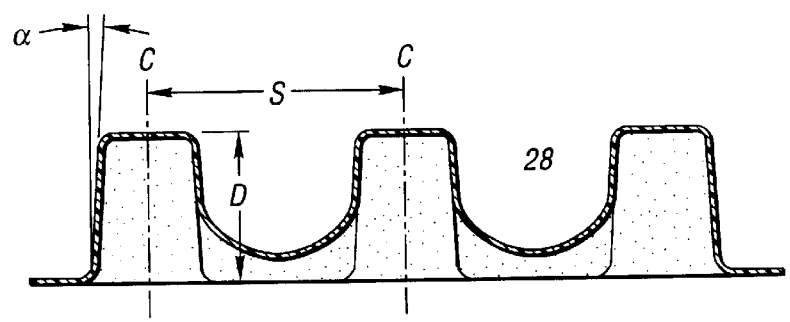
FIG. 5 is a cross-sectional view of the embodiment depicted in FIG. 4 taken along the line 5—5 thereof.

Turning now to FIGS. 4–5, there is depicted an alternate embodiment of the gamma structure of the invention wherein structural reinforcing ribs, rather than channels, connect at least some of the recesses.

In the preferred embodiment, the recesses may be joined by channels 26 of various depths (d) (FIG. 3) and shapes. Generally, the channels 26 are formed such that their depth (d) is less than the depth (D) of the floor 18 below the base 12.

Turning now to FIGS. 6–7, there is depicted a second alternate embodiment of the gamma structure of the present invention. In this embodiment, the modular energy absorbing assembly comprises two or more modules 30,32 which are inclined with respect to each other by an angle (β). In the module 32, the recesses 20' characterized by an imaginary line C'—C' which extends orthogonally to the base 12 such that the axes C'—C' and C—C (associated with the modules 30, 32) are parallel. Upon inspection of FIGS. 6–7, it will be appreciated that the angle (β) essentially defines the inclination of intersection planes. In practice, however, the bases of intersecting modules 30, 32 may not intersect discretely along a bend or joinder line, but instead be joined by a curvilinear intersecting segment (not shown). It may also be appreciated that the module 32 may be formed by folding a portion of the base 12 of module 30, such that the axes C'—C' may be inclined to the axes C—C.

The recesses may be shaped as truncated cones, sections of ellipsoids, sections of hyperboloids, or similar constructions, and may be of mixed shapes within a given energy absorbing module. Alternatively, at least some of the recesses are shaped as a cup, a cone, and frusto-conical body, a polyhedron, a tetrahedron, a prism, and a parallelepiped.

Continuing with reference to FIG. 7, in the first module (left hand side), an angle (α) denotes the angle of inclination of the wall 20 with respect to the center line C of a representative recess. In the second module, the angle (γ) represents the inclination of wall 20' with respect to a major incident component of the impacting force 24'.

In light of this disclosure, it will be apparent that the energy absorbing characteristics of the disclosed modular energy absorbing assembly can be tailored to suit the needs of the particular application by suitable combination of depth (D) of the recess, depth (d) of the channels, inter-recess spacing (S), wall inclination (α,γ), inter-module inclination (β), and recess shape.

Figure 8:
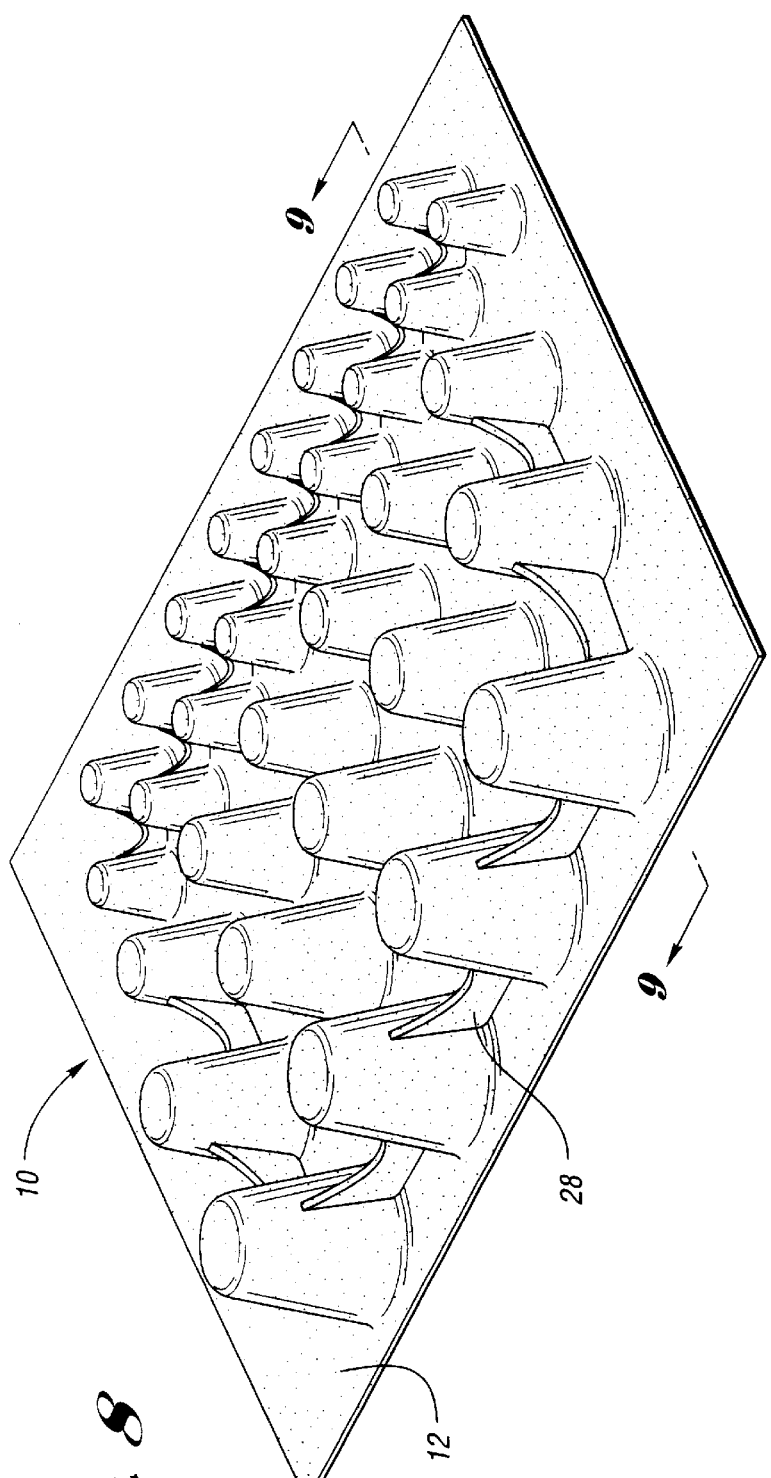
FIG. 8 is a quartering perspective view of a third alternate embodiment of the disclosed invention.
Figure 9:
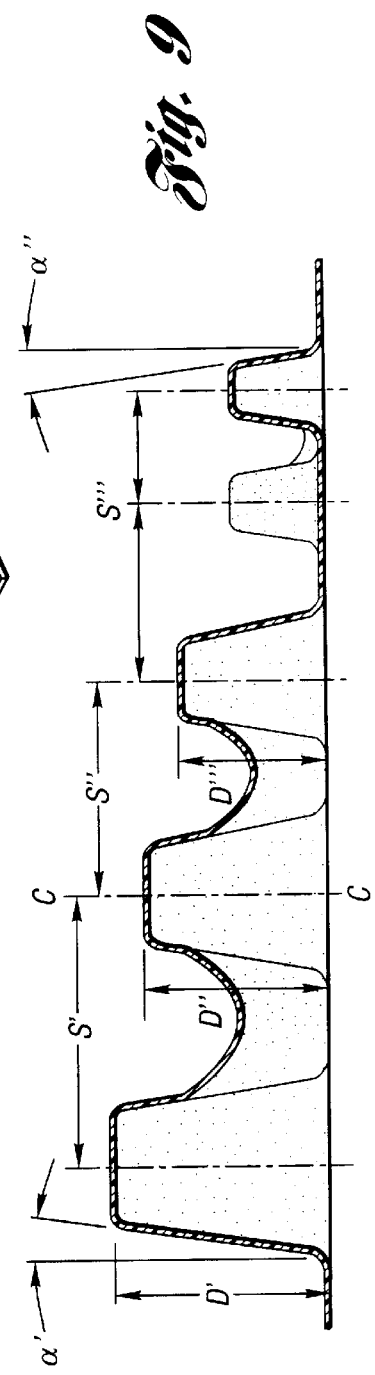
FIG. 9 is a cross-sectional view taken along the 9—9 of the embodiment depicted in FIG. 8.

Turning now to FIGS. 8–9, there is depicted another alternate embodiment of the gamma structure of the present invention wherein the modular energy absorbing assembly 10 includes recesses that are placed at intervals which include irregular center-to-center distances across the base 12. In FIG. 9, the depths of the recesses are depicted by the reference letters D', D", D''', etc. The inter-recess space is represented by the reference letters S', S", S''', etc. Customized angles of inclination are illustrated by the symbols α' and α".

Still further alternative embodiments comprehend the formation of one or more troughs or catches (not shown) that are generally defined within the bases 12 so that wires, tubes, and the like can be accommodated therein and so that one or more fluid conduits can be provided by the assembly.

Reference was made earlier to quantitative acceptance criteria which mandate that the HIC(d) value computed according to the FMVSS 201 formula shall not exceed 1000. The table below compares HIC(d) values of the disclosed invention with the values exhibited by competitive products:

Drop Tower HIC(d) Performance

Baseline Stiffness=1500 HIC(d); Sample Height=20 mm

| Energy Absorber | HIC(d) |
|---|---|
| Invention | 927 |
| Polyurethane Foam (Prior Art) (5.5 lb ft$^{-3}$) | 1024 |

Reference was also made above to the formation of one or more bending lines between adjacent energy absorbing modules in order to conform to abrupt contour changes of a substrate or structure to which the energy absorbing assembly is attached. The purpose of such axes is to orient an imaginary central line of the energy absorbing module substantially normally to a reaction surface. Depending upon the impact environment, these axes may either extend along the base (basal plane) or along an imaginary line connecting recesses and/or ribs.

One preferred technique for manufacturing the disclosed embodiments of the present invention is to use a thermoforming process, which begins with a thermoplastic sheet. Many types of thermoplastic resins may be used in a variety of sizes and thicknesses. Suitable materials for use in the disclosed thermoplastic process include: acrylonitrile-butadiene-styrene (ABS) resin, acetate, polycarbonate, polystyrene, polyethylene (low or high density), polypropylene, polyester, and polyvinyl chloride (PVC). Other suitable materials include any thermoplastic with an acceptable freezing range and softening character.

Sheet thickness (T) affects not only the thermoforming process steps and the characteristics of the modular energy absorbing assembly made thereby, but also significantly affects manufacturing economics. In general, less material is required to produce an assembly of the type disclosed herein when using lighter weight, thinner-gauge plastics. Conversely, the use of heavier-gauge materials requires more material, which tends to increase costs. Other things being equal, by a suitable selection of the design factors discussed herein, manufacturing economies can be realized while producing an energy absorbing assembly which is tailored to suit the needs of the particular operational environment.

Thermoforming allows the formation of gamma structures with relatively thin wall thicknesses. To achieve a thin wall section by other means, such as injection molding may, require the use of polymers having relatively high melt flows, hot molds, prolonged freezing times, and other accommodations, which tend to increase manufacturing costs.

A useful summary of conventional thermoforming arts is found in J. Florian, PRACTICAL THERMO FORMING, 2d Ed. (1996), Chs. 2–5 of which being incorporated herein by reference.

In a preferred embodiment, the composite modular energy absorbing assembly comprises one or more gamma structures 100 (FIG. 10). At least one of the gamma structures has a base 12'. A plurality of recesses 16' are defined within the base 12'. At least some of the recesses 16' have one or more walls 20' that extend from the associated base 12'. Some or all of the recesses 16' have a floor 18' that may or may not define an aperture (not shown) therewithin.

Positioned in operative engagement with at least some of the gamma structures 100 are one or more delta structures 200 that are best shown in FIGS. 11–12. In one embodiment, at least some of the delta structures 200 have a lattice 210 of interconnected strands. The strands intersect to define a plurality of cells 220. At least some of the cells are oriented such that the plane of each cell is substantially parallel to the impacting force F (FIG. 10) in order to maximize energy absorption over a given distance. The lattice collapses partially plastically and recovers partially elastically. At least some of the cells 220 become partially closed during energy absorption.

It will be appreciated that a number of combinations of gamma and delta structures that are interposed with each other may be effective in realizing the energy absorption characteristics of the disclosed composite modular energy absorbing assembly. For example, stacking arrangements could include: one or more gamma structures interposed with one or more delta structures, gamma structures alone; or delta structures alone.

Accordingly, the disclosed composite modular energy absorbing assembly affords a more efficient energy absorber than may be realized by utilizing single structures.

In some embodiments, the delta structure resembles that depicted as the first structure in commonly owned U.S. Pat. No. 6,199,942. In alternate embodiments, which are intended to be within the scope of the disclosed invention, the lattice of stranded cells may be configured as a crenelation, as a spiral, as a zig-zag (as depicted in commonly owned U.S. Pat. No. 6,199,942 (FIG. 1)), or in other forms which are adapted to achieve the objective of efficient energy absorption.

In one embodiment, the composite modular energy absorbing assembly includes an acoustic dampener 300 that is interposed between the gamma and delta structures.

In an alternate embodiment, a protrusion 310 (FIG. 10) extends from one or more bases of the gamma structure 100. Each protrusion 310 is interposed between at least some of the gamma and delta structures, and serves to reduce noise and provide a cushioning arrangement therebetween. Alternatively, one or more protrusions 310 are interposed between the gamma structure 100 and a support structure or substrate (not shown) with which the composite modular energy absorbing assembly is in operative engagement.

Figure 13:
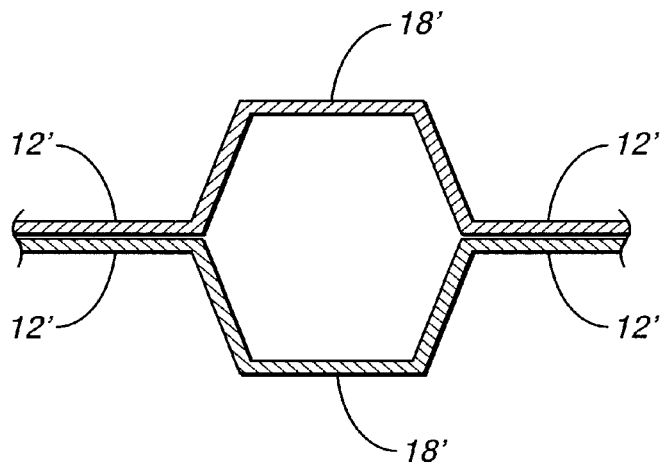
FIG. 13 is a partial cross-sectional view of an alternate embodiment of the invention wherein adjacent bases of two gamma structures are placed in operative engagement with each other, and the associated floors are spaced apart.
Figure 14:
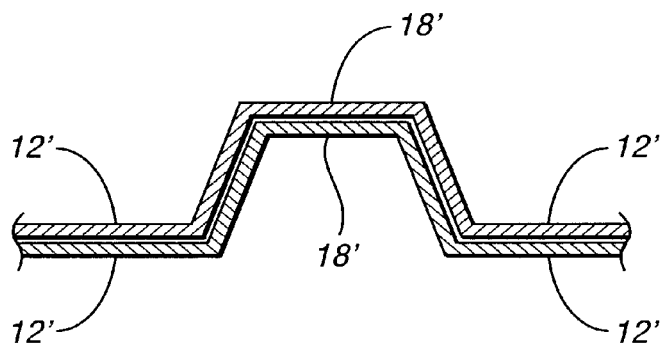
FIG. 14 is a partial cross-sectional view of nested gamma structures wherein the floors of adjacent gamma structures are in juxtaposition and associated bases are in juxtaposition.
Figure 15:
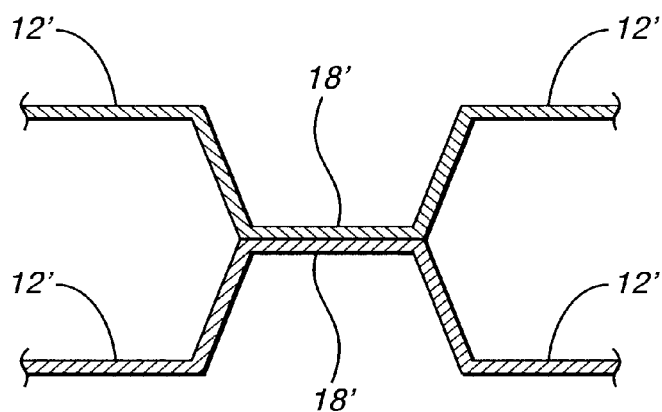
FIG. 15 is a partial cross-sectional view of a still further alternate embodiment wherein the floors of adjacent gamma structures are in juxtaposition.

Continuing with reference to FIGS. 13–15, it will be appreciated that one or more gamma structures 100 may be stacked such that the bases 12' of adjacent gamma structures are in juxtaposition with each other. FIG. 13 is a partial cross-sectional view wherein adjacent bases 12' of two gamma structures are placed in operative engagement with each other, and the associated floors 18' are spaced apart.

FIG. 14 is a cross-sectional view of nested gamma structures wherein the floors 18' of adjacent gamma structures are in juxtaposition and associated bases 12' are in juxtaposition.

Optionally, the modular energy absorbing assembly, as depicted in FIG. 15, may be composed of one or more gamma structures that are stacked such that the top side of a floor 18' of a gamma structure is in juxtaposition with a top side of a floor 18' of an adjacent, inverted gamma structure.

In still another embodiment of the invention, at least some of the recesses are at least partially filled with a homogenous or heterogenous medium other than air. Some of the recesses, for example, are at least partially filled with pellets. Preferably, such pellets or beads may be formed from resin, or glass, or other ceramics. Other examples of a medium which at least partially fills some of the recesses include, without limitation, ribs or channels, foams, and other fluids. Such structures have been found to change the dynamics of collapse in a favorable manner, while reinforcing the structure of the composite modular energy absorbing assembly.

In another embodiment, the fluid comprises air that is contained within a bladder which is accommodated within a recess. Alternatively, the recess itself may serve to contain the fluid.

As referenced earlier, FIGS. 13–15 depict alternative configurations of stacked cones. In one series of experiments, observations were made of the performance of different configurations of absorbers that have a total height of about 40 millimeters. The primary objective was to determine the relative impact performance of various stacking arrangements of two stacked 20 millimeter specimens. One stacking arrangement is depicted in FIG. 13. The stacked samples were arranged in an in-line position, with the cones in line in the plan view, or offset. The performance of a 40 millimeter sandwich sample (similar to that depicted in FIG. 14), and a 40 millimeter high cone sample (similar to those depicted in FIG. 4) were compared. As depicted in FIG. 15, the performance of two gamma structures was observed, with the two gamma structures being stacked such that the top side of a floor of a gamma structure was in juxtaposition with a topside of a floor of an adjacent, inverted gamma structure.

To assess the performance of the alternate configurations, head injury criteria (HIC(d)) were determined using a drop tower test with a constrained headform impacting at 15 mph. The results suggested that the best performers included two stacked 20 millimeter high samples with the cones facing away from each other (FIG. 13). It was found that the sandwiched samples (FIG. 14) performed well, but were suboptimal.

These, among other experiments, suggested that in order to optimize HIC(d), the structures can be stacked with the cones pointing away from each other and have approximately the same thickness.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A composite modular energy absorbing assembly comprising:
   a pair of gamma structures, at least one of the pair having:
   a base; and
   a plurality of recesses defined within the base, at least some of the plurality of recesses having
   a floor; and
   at least one wall extending between the base and the floor,
   wherein at least some of the plurality of recesses are oriented such that their walls are inclined at an angle alpha to the major incident component of the impacting force, where alpha lies between 0 and 45 degrees, so that energy absorption is provided primarily by at least partial collapse of the at least one wall primarily in a non-pneumatic manner.

2. The composite modular energy absorbing assembly of claim 1, wherein at least some of the floors define an aperture therein.

3. The composite energy absorbing assembly of claim 1, wherein at least some of the recesses have a shape selected from the group consisting of as a cup, a cone, a frusto-conical body, a polyhedron, a tetrahedron, a prism, a parallelepiped, a truncated cone, a section of an ellipsoid, a section of an hyperboloid, and mixtures of such shapes.

4. The composite modular energy absorbing assembly of claim 1, wherein the one or more gamma structures are stacked such that the bases of adjacent gamma structures are in juxtaposition with each other.

5. The composite modular energy absorbing assembly of claim 1, wherein the one or more gamma structures are stacked such that the floors of adjacent gamma structures are in juxtaposition with each other.

6. The composite modular energy absorbing assembly of claim 1, wherein the one or more gamma structures are stacked such that the topside of a floor of a gamma structure is in juxtaposition with a topside of a floor of an adjacent, inverted gamma structure.

7. A composite modular energy absorbing assembly comprising:
   a pair of gamma structures, at least one of the pair having:
   a base; and
   a plurality of recesses defined within the base, at least some of the plurality of recesses having
   at least one wall extending from the base,
   wherein at least some of the plurality of recesses are oriented such that their walls are inclined at an angle alpha to the major incident component of the impacting force, where alpha lies between 0 and 45 degrees, so that energy absorption is provided primarily by at least partial collapse of the at least one wall primarily in a non-pneumatic manner.

8. The composite modular energy absorbing assembly of claim 7, wherein at least some of the recesses are at least partially filled with a fluid.

9. The composite modular energy absorbing assembly of claim 7, wherein at least some of the recesses are at least partially filled with pellets.

10. The modular composite energy absorbing assembly of claim 8, wherein the fluid comprises a filler material disposed at least partially within the energy absorbing module, the filler material being selected from the group consisting of a pelletized material, a granular material, a foam, a gas, and mixtures thereof.

11. A composite modular energy absorbing assembly comprising:

a plurality of energy absorbing structures in which at least portions of adjacent structures are in operative engagement, each energy absorbing structure comprising a gamma structure, at least some of the structures having:

a base; and a plurality of recesses extending from the base, at least some of the plurality of recesses having a wall extending from the base, wherein at least some of the plurality of recesses are oriented such that their walls are inclined at an angle alpha to a major incident component of an impacting force, where alpha lies between 0 and 45 degrees, so that energy absorption is provided primarily by at least partial collapse of the at least one wall primarily in a non-pneumatic manner.

* * * * *